(12) United States Patent
Nakano

(10) Patent No.: US 12,743,866 B2
(45) Date of Patent: Sep. 22, 2026

(54) FUNDAMENTAL MATRIX GENERATION APPARATUS, CONTROL METHOD, AND COMPUTER-READABLE MEDIUM

(71) Applicant: NEC Corporation, Tokyo (JP)

(72) Inventor: Gaku Nakano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 324 days.

(21) Appl. No.: 18/280,415

(22) PCT Filed: Mar. 9, 2021

(86) PCT No.: PCT/JP2021/009391
§ 371 (c)(1),
(2) Date: Sep. 5, 2023

(87) PCT Pub. No.: WO2022/190224
PCT Pub. Date: Sep. 15, 2022

(65) Prior Publication Data
US 2024/0153233 A1 May 9, 2024

(51) Int. Cl.
*G06V 10/46* (2022.01)
*G06T 7/80* (2017.01)
(Continued)

(52) U.S. Cl.
CPC .............. *G06V 10/462* (2022.01); *G06T 7/80* (2017.01); *G06V 10/757* (2022.01); *G06V 10/7715* (2022.01)

(58) Field of Classification Search
CPC ............... G06V 10/462; G06V 10/757; G06V 10/7715; G06T 7/80; G06T 7/593; G06T 7/33
See application file for complete search history.

(56) References Cited

U.S. PATENT DOCUMENTS 8,401,342 B2 3/2013 Ruzon et al.
2006/0026646 A1 2/2006 Lou et al.
(Continued)

FOREIGN PATENT DOCUMENTS

JP 2015-138413 A 7/2015
JP 2015-233212 A 12/2015
(Continued)

OTHER PUBLICATIONS

Intrinsic Camera Parameters, Whitehead et al 2004 (Year: 2004).*
(Continued)

*Primary Examiner* — Jianxun Yang
(74) *Attorney, Agent, or Firm* — Sughrue Mion, PLLC

(57) ABSTRACT

A fundamental matrix generation apparatus performs: detecting three or more feature point pairs from a first image and a second image; detecting, for each of the feature point pairs, a derived point pair that is a pair of a derived point separated by a first distance in a first direction from a point on the first image included in the feature point pair and a derived point separated by a second distance in a second direction from a point on the second image included in the feature point pair; generating a fundamental matrix or the fundamental matrix representing an epipolar constraint on a point on the first image and a point on the second image by using the detected feature point pairs and derived point pairs.

9 Claims, 7 Drawing Sheets

(51) Int. Cl.
*G06V 10/75* (2022.01)
*G06V 10/77* (2022.01)

(56) References Cited

U.S. PATENT DOCUMENTS

| | | | | |
|---|---|---|---|---|
| 2008/0137940 | A1* | 6/2008 | Kakinami | G06T 7/246 382/154 |
| 2016/0117828 | A1 | 4/2016 | Choi et al. | |
| 2016/0150211 | A1 | 5/2016 | Hwang et al. | |
| 2016/0371817 | A1 | 12/2016 | Matsubara | |
| 2020/0357158 | A1 | 11/2020 | Zhang et al. | |
| 2021/0312661 | A1 | 10/2021 | Kojima | |
| 2022/0108544 | A1 | 4/2022 | Becker | |
| 2023/0419515 | A1 | 12/2023 | Nakano | |
| 2024/0127416 | A1 | 4/2024 | Schmidt et al. | |
| 2024/0135674 | A1 | 4/2024 | Nakano | |

FOREIGN PATENT DOCUMENTS

| | | |
|---|---|---|
| JP | 2016-100899 A | 5/2016 |
| JP | 2017-011431 A | 1/2017 |
| JP | 2017-174105 A | 9/2017 |
| JP | 2020-057182 A | 4/2020 |

OTHER PUBLICATIONS

Homography, Barath et al 2019 (IDS) (Year: 2019).*

International Search Report for PCT Application No. PCT/JP2021/009391, mailed on Apr. 27, 2021.

R. Hartley and A. Zisserman, "Multiple view geometry in computer vision 2nd edition", Cambridge University Press, Mar. 25, 2004, pp. 279-282.

H. Stewenius, Three others, "A minimal solution for relative pose with unknown focal length", Image and Vision Computing, Jul. 2008, vol. 26, issue 7, pp. 871-877.

F. Jiang, Three others, "A minimal solution to relative pose with unknown focal length and radial distortion", Springer, Asian Conference on Computer Vision, Nov. 1, 2014, pp. 443-456.

D. Barath, Two others, "A minimal solution for two-view focal-length estimation using two affine correspondences", Computer Research Repository, arXiv:1706.01649, Jun. 6, 2017.

D. Barath and Z. Kukelova, "Homography from two orientation- and scale-covariant features", Computer Research Repository, arXiv:1906.11927, Jun. 27, 2019.

International Search Report for PCT Application No. PCT/JP2020/041962, mailed on Jan. 26, 2021.

US Office Action for U.S. Appl. No. 18/034,833, mailed on Aug. 1, 2025.

Li, Z.Y., Song, L.M., Xi, J.T., Guo, Q.H., Zhu, X.J. and Chen, M.L., 2015, "A stereo matching algorithm based on SIFT feature and homography matrix", Optoelectronics letters, 11(5), pp. 390-394. (Year: 2015).

Ding T, Yang Y, Zhu Z, Robinson DP, Vidal R, Kneip L, Tsakiris MC, "Robust homography estimation via dual principal component pursuit", In Proceedings of the IEEE/CVF Conference on Computer Vision and Pattern Recognition 2020 (pp. 6080-6089). (Year: 2020).

Cai, Shen, et al., "Fast and interpretable 2D homography decomposition: Similarity-kernel-similarity and affine-core-affine transformations", IEEE Transactions on Pattern Analysis and Machine Intelligence (2025). (Year: 2025).

Vincent, Etienne, and Robert Laganiere, "Detecting planar homographies in an image pair", Proceedings of the 2nd International Symposium on Image and Signal Processing and Analysis, in conjunction with 23rd International Conference on Information Technology Interfaces (IEEE Cat.. IEEE, 2001. (Year: 2001).

David Nister, "An Efficient Solution to the Five-Point Relative Pose Problem", IEEE transactions on pattern analysis and machine intelligence, Apr. 19, 2004, vol. 26, Issue 6, pp. 756-770.

Carlo Tomasi, "The Eight-Point Algorithm", 2015, Duke University, <URL: https://www2.cs.duke.edu/courses/fall15/compsci527/notes/longuet-higgins.pdf>, (1) 2_1.

Carlo Tomasi, "The Eight-Point Algorithm", 2015, Duke University, <URL: https://www2.cs.duke.edu/courses/fall15/compsci527/notes/longuet-higgins.pdf>, (1) 2_2.

Daniel Barath et al., "Efficient Recovery of Essential Matrix from Two Affine Correspondences", IEEE Transactions on Image Processing, Jun. 22, 2018, vol. 27, Issue 11.

International Search Report for PCT Application No. PCT/JP2021/008289, mailed on Apr. 27, 2021.

US Notice of Allowance for U.S. Appl. No. 18/034,833, mailed on Jan. 29, 2026.

Yan, Qing, et al.; "Heask: Robust homography estimation based on appearance similarity and keypoint correspondences"; Pattern Recognition 47.1 (2014): 368-387; (Year: 2014).

* cited by examiner

FUNDAMENTAL MATRIX GENERATION APPARATUS, CONTROL METHOD, AND COMPUTER-READABLE MEDIUM

TECHNICAL FIELD

The present disclosure relates to generation of a fundamental matrix.

BACKGROUND ART

A technique for estimating relative camera parameters between two images, which are obtained by capturing the same subject from different positions, using a camera in which internal parameters such as a focal length are unknown has been developed. The relative camera parameters include external parameters (three-dimensional translation vector with two degrees of freedom and rotation with three degrees of freedom) whose absolute magnitudes are unknown and internal parameters such as a focal length, and are expressed as a fundamental matrix obtained by multiplying these parameters.

For example, Non Patent Literature 1 discloses a method of computing a fundamental matrix by using eight or more sets of corresponding points between images in which the same three-dimensional coordinates are projected on the images. Non Patent Literature 2 discloses a method of estimating a focal length simultaneously with a fundamental matrix using six sets of corresponding points. Non Patent Literature 3 discloses a method of estimating a focal length and lens distortion simultaneously with a fundamental matrix using seven or more sets of corresponding points. Non Patent Literature 4 discloses a method of computing a fundamental matrix and a focal length from two sets of corresponding points by using affine-invariant feature points. In Non Patent Literatures 1 to 4 described above, a plurality of pairs of feature points corresponding to each other are detected from two images, and an accurate fundamental matrix is generated by removing erroneous corresponding points from a set of the detected pairs of feature points using a robust estimation algorithm such as RANdom SAmple Consensus (RANSAC).

CITATION LIST

Non Patent Literature

Non Patent Literature 1: R. Hartley and A. Zisserman, “Multiple view geometry in computer vision 2nd edition”, Cambridge University Press, Mar. 25, 2004, pp. 279-282

Non Patent Literature 2: H. Stewenius, Three others “A minimal solution for relative pose with unknown focal length”, Image and Vision Computing, July 2008, Volume 26, issue 7, pp. 871-877

Non Patent Literature 3: F. Jiang, Three others “A minimal solution to relative pose with unknown focal length and radial distortion”, Springer, Asian Conference on Computer Vision, Nov. 1, 2014, pp. 443-456

Non Patent Literature 4: D. Barath, and Two others, “A minimal solution for two-view focal-length estimation using two affine correspondences”, Computer Research Repository, arXiv: 1706.01649, Jun. 6, 2017

SUMMARY OF INVENTION

Technical Problem

The present inventor has studied a new technique for generating a fundamental matrix. An object of the present disclosure is to provide a new technique for generating a fundamental matrix.

Solution to Problem

A fundamental matrix generation apparatus of the present disclosure includes: a first detection unit configured to detect three or more feature point pairs, which are pairs of feature points corresponding to each other, from a first image and a second image; a second detection unit configured to detect, for each of the feature point pairs, a derived point pair that is a pair of a point separated by a first distance in a first direction from a point on the first image included in the feature point pair and a point separated by a second distance in a second direction from a point on the second image included in the feature point pair; and a generation unit configured to generate a fundamental matrix representing an epipolar constraint between a point on the first image and a point on the second image using each of the detected feature point pairs and derived point pairs The first direction and the first distance are each determined based on a feature value computed for the point on the first image included in the feature point pair. The second direction and the second distance are each determined based on a feature value computed for the point on the second image included in the feature point pair.

A control method of the present disclosure is executed by a computer. The control method includes: a first detection step of detecting three or more feature point pairs, which are pairs of feature points corresponding to each other, from a first image and a second image; a second detection step of detecting, for each of the feature point pairs, a derived point pair that is a pair of a point separated by a first distance in a first direction from a point on the first image included in the feature point pair and a point separated by a second distance in a second direction from a point on the second image included in the feature point pair; and a generation step of generating a fundamental matrix representing an epipolar constraint between a point on the first image and a point on the second image using each of the detected feature point pairs and derived point pairs The first direction and the first distance are each determined based on a feature value computed for the point on the first image included in the feature point pair. The second direction and the second distance are each determined based on a feature value computed for the point on the second image included in the feature point pair.

A computer-readable medium of the present disclosure stores a program causing a computer to execute the control method of the present disclosure.

Advantageous Effects of Invention

According to the present disclosure, the new technique for generating the fundamental matrix is provided.

EXAMPLE EMBODIMENT

Figure 1:
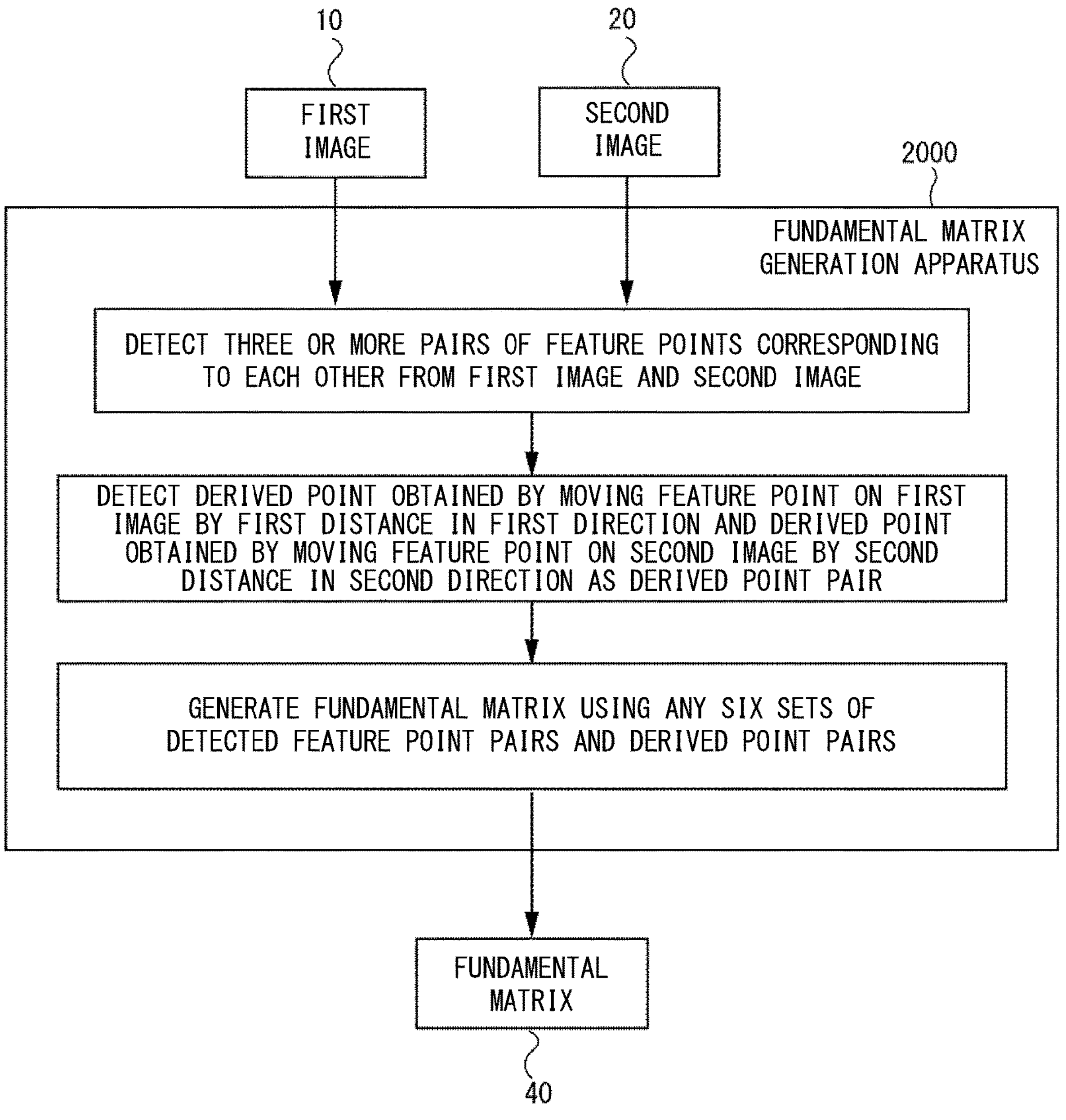
FIG. 1 is a diagram illustrating an overview of an operation of a fundamental matrix generation apparatus of a first example embodiment.

Hereinafter, am example embodiment of the present disclosure will be described in detail with reference to the drawings. In the drawings, the same or corresponding elements are denoted by the same reference numerals, and repeated description is omitted as necessary for clarity of description. Further, unless otherwise described, predetermined values such as predetermined values and thresholds are stored in advance in a storage apparatus or the like accessible from an apparatus using the values.

FIG. 1 is a diagram illustrating an overview of an operation of a fundamental matrix generation apparatus 2000 of a first example embodiment. Here, FIG. 1 is a diagram for facilitating understanding of the overview of the fundamental matrix generation apparatus 2000, and the operation of the fundamental matrix generation apparatus 2000 is not limited to that illustrated in FIG. 1.

The fundamental matrix generation apparatus 2000 acquires a first image and a second image 20, and generates a fundamental matrix 40 that is a matrix representing a geometric constraint (referred to as an epipolar constraint) between a point on the first image 10 and a point on the second image 20. The epipolar constraint that is to be satisfied by the fundamental matrix 40 is expressed by, for example, the following Equation (1).

Equation 1

$$n^T F m = 0 \tag{1}$$

Here, a point m is a point on the first image 10, a point n is a point on the second image 20, and these are points obtained by projecting the same three-dimensional coordinate to the respective images. That is, the point n and the point m are points representing the same place in the real space. Note that both the points m and n are represented by coordinates in a homogeneous coordinate system of 3×1 in both cases of including and not including lens distortion as described in Non Patent Literature 3. It is known that F is the fundamental matrix 40 of 3×3, and has three singular values one of which is zero.

Further, a constraint regarding the singular values is expressed by the following Equation (2).

Equation 2

$$\det(F) = 0 \tag{2}$$
$$2FQF^T QF - \operatorname{trace}(FQF^T Q)F = 0$$
$$\text{where, } Q = K^T K$$

Here, K is a 3×3 matrix representing camera internal parameters such as a focal length.

Hereinafter, when simply referred to as internal parameters, a lens distortion parameter is also included in addition to the matrix K.

The fundamental matrix generation apparatus 2000 generates six or more pairs of points (corresponding points) corresponding to each other between the first image 10 and the second image 20 in order to compute the fundamental matrix 40. Hereinafter, a pair of corresponding points is referred to as a corresponding point pair. Here, a point on the first image 10 and a point on the second image 20 included in a corresponding point pair are points representing the same place in the real space.

The fundamental matrix generation apparatus 2000 detects the corresponding point pair by the following method. First, the fundamental matrix generation apparatus 2000 detects a pair of feature points (feature point pair) corresponding to each other from feature points detected from the first image 10 and feature points detected from the second image 20. That is, a certain feature point on the first image 10 and a feature point on the second image 20 corresponding to the certain feature point are detected as a feature point pair. Here, at least three feature point pairs are detected as corresponding point pairs to be used for generating the fundamental matrix 40.

The fundamental matrix generation apparatus 2000 further detects a corresponding point pair using a feature point pair detected by the above-described method. Specifically, the fundamental matrix generation apparatus 2000 detects a pair of a derived point, which is separated by a first distance in a first direction from a feature point on the first image 10 included in the feature point pair, and a derived point separated by a second distance in a second direction from a feature point on the second image 20 included in the feature point pair. Hereinafter, a pair of the derived points detected in this manner is also referred to as a derived point pair.

The first direction, the first distance, the second direction, and the second distance are determined using feature values that are computed for feature points. For example, it is assumed that a feature value (hereinafter, a scale-invariant feature value), such as a SIFT, that is invariable with respect to a scale and with respect to a main-axis direction is used as the feature value. In this case, for example, a main-axis direction determined by a feature value computed for a feature point on the first image 10 is used as the first direction. Similarly, for example, a main-axis direction determined by a feature value computed for a feature point on the second image 20 is used as the second direction. Further, for example, a size of a scale determined by the feature value computed for the feature point on the first image 10 is used as the first distance. Similarly, for example, a size of a scale determined by the feature value computed for the feature point on the second image 20 is used as the second distance.

Figure 2:
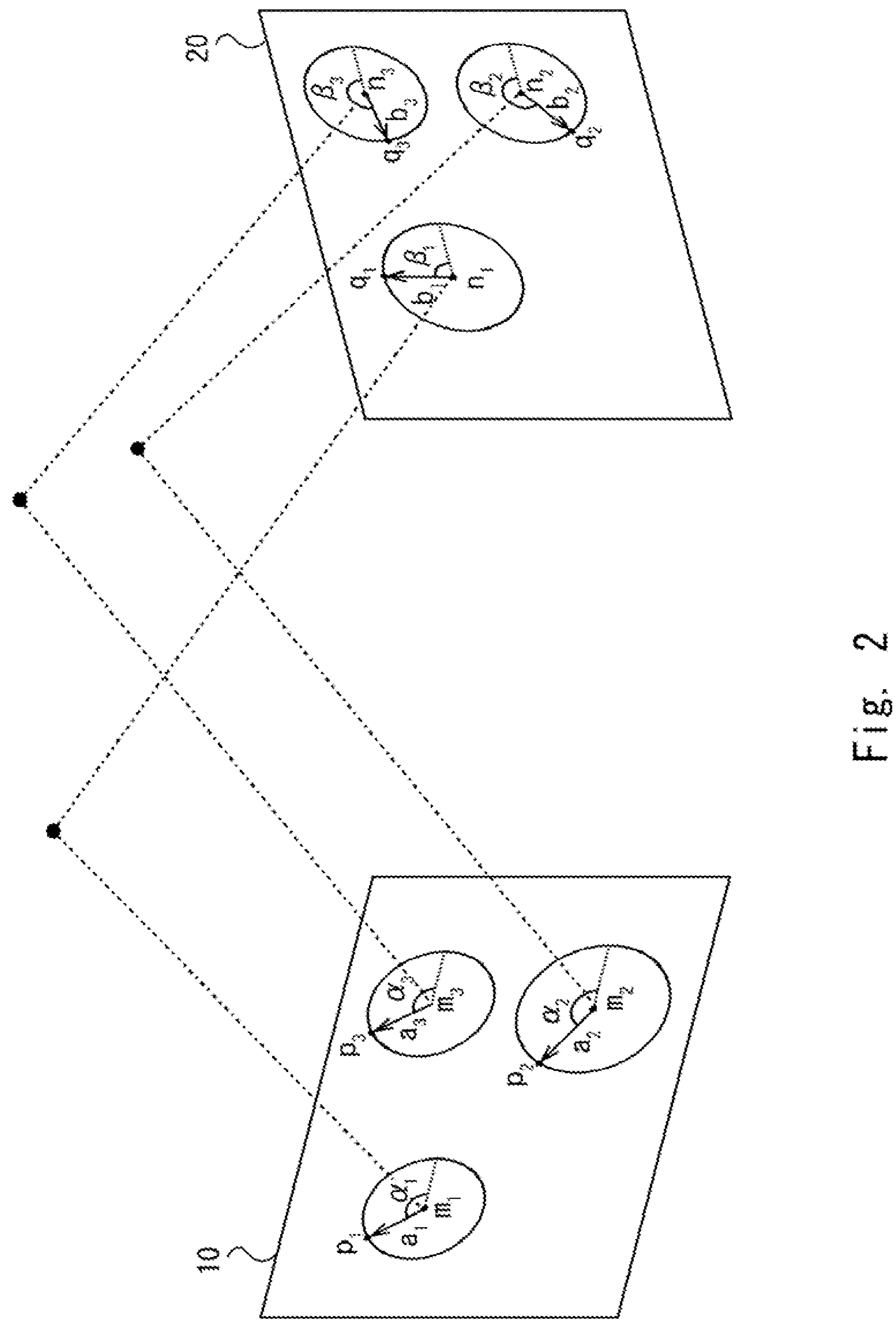
FIG. 2 is a diagram illustrating a feature point pair and a derived point pair.

FIG. 2 is a diagram illustrating a feature point pair and a derived point pair. In the example of FIG. 2, (m1, n1), (m2, n2), and (m3, n3) are detected as feature point pairs. Here, $m1$, $m2$, and $m3$ are feature points on the first image 10, and $n1$, $n2$, and $n3$ are feature points on the second image 20. Further, a scale $a1$ and a main-axis direction $\alpha1$ are determined by a scale-invariant feature value computed for the feature point $m1$. Similarly, a scale $b1$ and a main-axis direction $\beta1$ are determined by a scale-invariant feature value computed for the feature point $n1$. Note that a direction in this example is represented by an angle in which the right side of an image in the horizontal direction is set to 0 degrees as a reference.

The fundamental matrix generation apparatus 2000 detects a derived point $p1$ that is obtained by moving the feature point $m1$ by $a1$ in the main-axis direction $\alpha1$ of the feature value. Further, the fundamental matrix generation apparatus 2000 detects a derived point $q1$ that is obtained by moving the feature point $n1$ by $b1$ in the main-axis direction $\beta1$ of the feature value. As a result, a pair ($p1$, $q1$) of the derived point $p1$ and the derived point $q1$ is detected as a derived point pair. Note that the derived point $p1$ can also be expressed as a point in the main-axis direction on a circumference whose radius is $a1$ and whose center is at the feature point $m1$. The same applies to the derived point $q1$.

In the same manner, the fundamental matrix generation apparatus 2000 detects derived points $p2$ and $p3$ that are obtained by moving the feature points $m2$ and $m3$ on the first image 10 by $a2$ and $a3$ in main-axis directions $\alpha2$ and $\alpha3$ of their feature values, respectively. Further, the fundamental matrix generation apparatus 2000 detects derived points $q2$ and $q3$ that are obtained by moving the feature points $n2$ and $n3$ on the second image 20 by $b2$ and $b3$ in main-axis directions $\beta2$ and $\beta3$ of their feature values, respectively. As a result, derived point pairs ($p2$, $q2$) and ($p3$, $q3$) are detected.

The fundamental matrix generation apparatus 2000 generates the fundamental matrix 40 using the detected six or more corresponding point pairs.

Example of Advantageous Effect

In an invention of Non Patent Literature 1, a fundamental matrix 40 is generated using eight or more pairs of feature points for the first image 10 and the second image 20 in the present disclosure. On the other hand, in the fundamental matrix generation apparatus 2000 of the present example embodiment, the fundamental matrix 40 can be generated with six or more feature point pairs and derived point pairs in total. Therefore, the minimum number of feature point pairs that need to be detected from the images is three. Therefore, there is an advantage that the number of feature point pairs that need to be detected from the images is smaller as compared with the invention of Patent Literature 1.

Hereinafter, the fundamental matrix generation apparatus 2000 of the present example embodiment will be described in more detail.

Example of Functional Configuration

Figure 3:
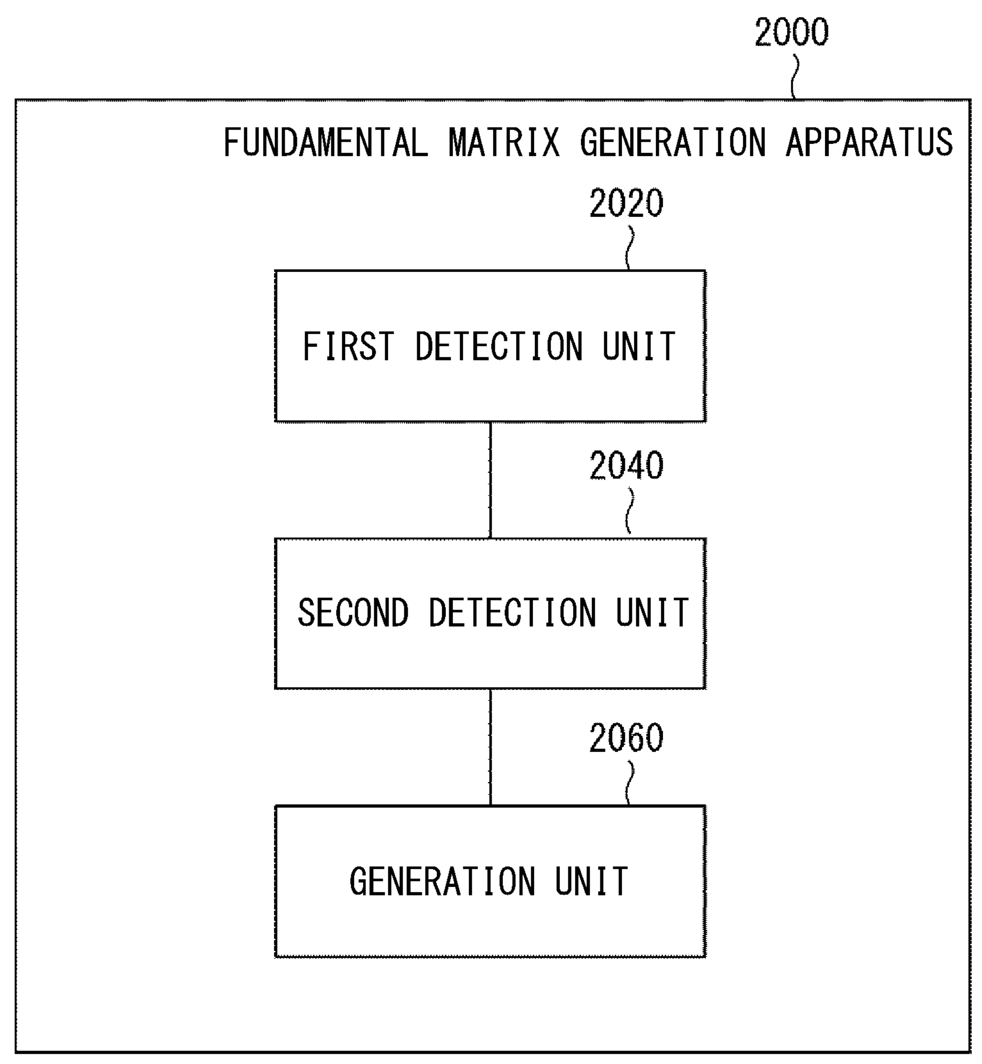
FIG. 3 is a block diagram illustrating a functional configuration of the fundamental matrix generation apparatus of the first example embodiment.

FIG. 3 is a block diagram illustrating a functional configuration of the fundamental matrix generation apparatus 2000 of the first example embodiment. The fundamental matrix generation apparatus 2000 includes a first detection unit 2020, a second detection unit 2040, and a generation unit 2060. The first detection unit 2020 detects three or more feature point pairs from the first image 10 and the second image 20. The second detection unit 2040 detects three or more derived point pairs from the first image 10 and the second image 20 using three or more feature point pairs, respectively. The generation unit 2060. generates the fundamental matrix 40 using the detected feature point pairs and derived point pairs.

Example of Hardware Configuration

Each functional configuration unit of the fundamental matrix generation apparatus 2000 may be realized by hardware (for example, a hard-wired electronic circuit or the like) that realizes each functional configuration unit, or may be realized by a combination of hardware and software (for example, a combination of an electronic circuit and a program that controls the electronic circuit or the like). Hereinafter, a case where each functional configuration unit of the fundamental matrix generation apparatus 2000 is realized by a combination of hardware and software will be further described.

Figure 4:
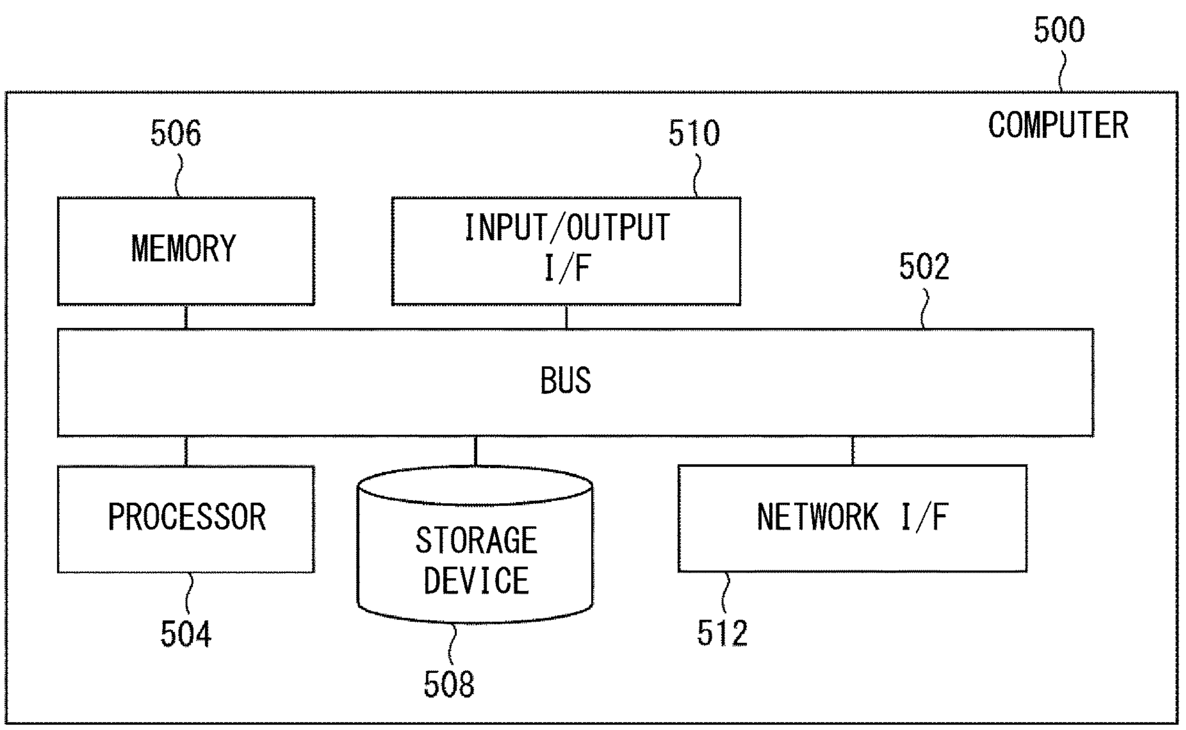
FIG. 4 is a block diagram illustrating a hardware configuration of a computer that realizes the fundamental matrix generation apparatus.
Figure 5:
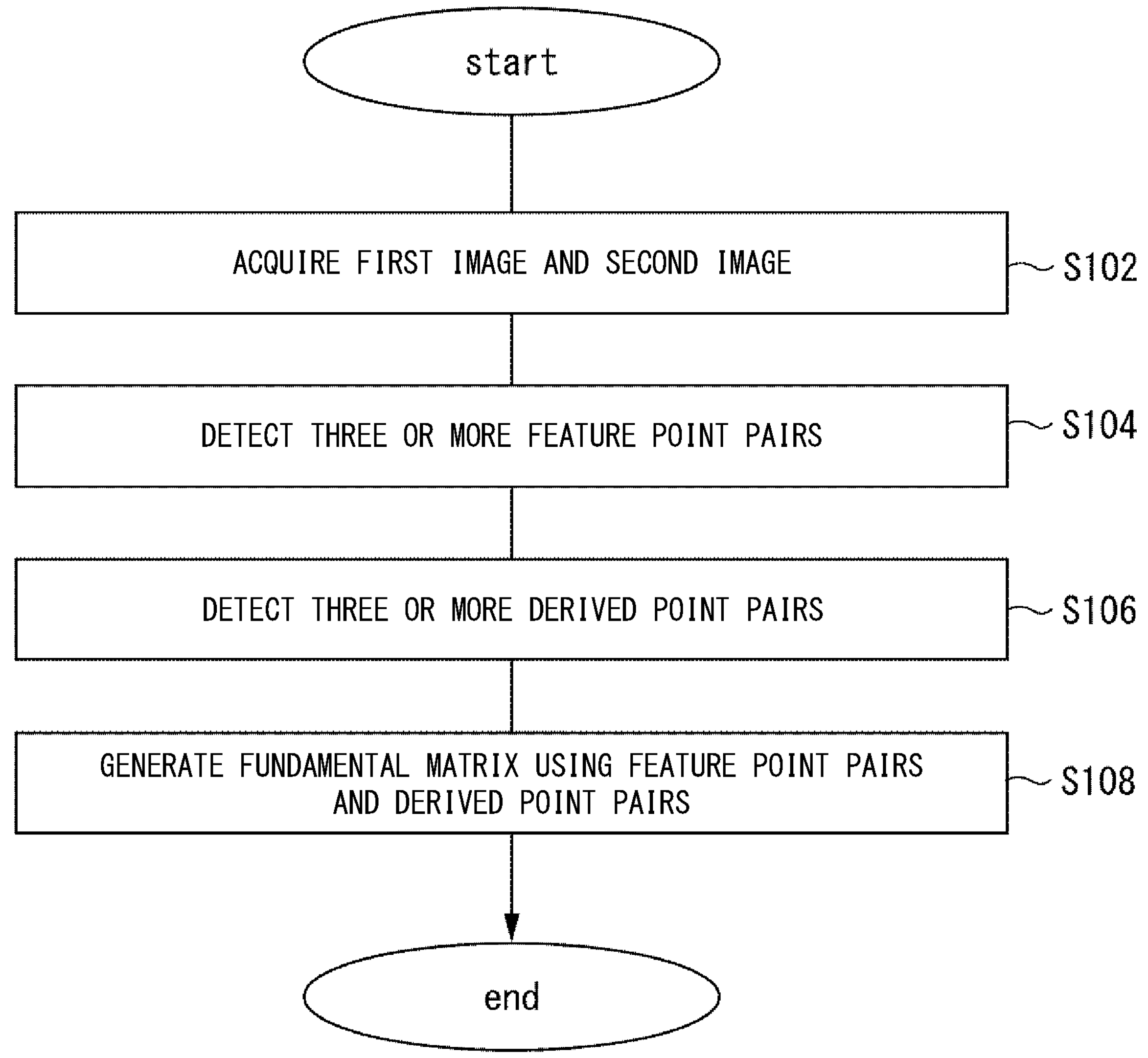
FIG. 5 is a flowchart illustrating a flow of processing executed by the fundamental matrix generation apparatus of the first example embodiment.

FIG. 4 is a block diagram illustrating a hardware configuration of a computer 500 that realizes the fundamental matrix generation apparatus 2000. The computer 500 is any computer. For example, the computer 500 is a stationary computer such as a personal computer (PC) or a server machine. In addition, for example, the computer 500 is a portable computer such as a smartphone or a tablet terminal. The computer 500 may be a special-purpose computer designed to realize the fundamental matrix generation apparatus 2000, or may be a general-purpose computer.

For example, each function of the fundamental matrix generation apparatus 2000 is realized in the computer 500 by installing a predetermined application with respect to the computer 500. The above-described application is configured by a program for realizing the functional configuration units of the fundamental matrix generation apparatus 2000. Note that the above-described program may be acquired by any method. For example, the program can be acquired from a storage medium (a DVD disk, a USB memory, or the like) in which the program is stored. In addition, for example, the program can be acquired by downloading the program from a server apparatus that manages a storage apparatus in which the program is stored.

The computer 500 includes a bus 502, a processor 504, a memory 506, a storage device 508, an input/output interface 510, and a network interface 512. The bus 502 is a data transmission path for the processor 504, the memory 506, the storage device 508, the input/output interface 510, and the network interface 512 to transmit and receive data to and from each other. However, the method of connecting the processor 504 and the like to each other is not limited to the bus connection.

The processor 504 is any of processors such as a central processing unit (CPU), a graphics processing unit (GPU), or a field-programmable gate array (FPGA). The memory 506 is a primary storage device realized by using a random access memory (RAM) or the like. The storage device 508 is a secondary storage device realized by using a hard disk, a solid state drive (SSD), a memory card, read only memory (ROM), or the like.

The input/output interface 510 is an interface connecting the computer 500 and an input/output device. For example, an input apparatus such as a keyboard and an output apparatus such as a display apparatus are connected to the input/output interface 510.

The network interface 512 is an interface for connecting the computer 500 to a network. The network may be a local area network (LAN) or a wide area network (WAN).

The storage device 508 stores a program (program for realizing the above-described application) for realizing each functional configuration unit of the fundamental matrix generation apparatus 2000. The processor 504 implements each functional configuration unit of the fundamental matrix generation apparatus 2000 by reading and executing this program in the memory 506.

The fundamental matrix generation apparatus 2000 may be realized by one computer 500 or may be realized by a plurality of computers 500. In the latter case, the configurations of the computers 500 do not need to be the same, and can be different from each other.

<Flow of Processing>

FIG. 4 is a flowchart illustrating a flow of processing executed by the fundamental matrix generation apparatus 2000 of the first example embodiment. The first detection unit 2020 acquires the first image 10 and the second image 20 (S102). The first detection unit 2020 detects three or more feature point pairs using the first image 10 and the second image 20 (S104). The second detection unit 2040 detects derived point pairs for the feature point pairs, respectively, using the first image 10 and the second image 20 (S106). The generation unit 2060 generates the fundamental matrix 40 using the feature point pairs and the derived point pairs (S108).

<First Image 10 and Second Image 20>

The first image 10 and the second image 20 are any captured images generated by any camera. However, the first image 10 and the second image 20 each includes an image region in which the same place has been captured in at least a part thereof. For example, the first image 10 and the second image 20 are generated by capturing the same building or person from different positions and angles.

<Acquisition of First Image 10 and Second Image 20: S102>

The first detection unit 2020 acquires the first image 10 and the second image 20 (S102). The first detection unit 2020 acquires the first image 10 and the second image 20 by any method. For example, the first detection unit 2020 acquires the first image 10 and the second image 20 from a storage apparatus in which these images are stored. Note that the first image 10 and the second image 20 may be stored in the same storage apparatus, or may be stored in different storage apparatuses. In addition, for example, the first detection unit 2020 may acquire the first image 10 and the second image 20 from each of a camera that has generated the first image 10 and a camera that has generated the second image 20.

<Detection of Feature Point Pair: S104>

The first detection unit 2020 detects the three or more feature point pairs from the first image 10 and the second image 20 (S104). Therefore, the first detection unit 2020 detects feature points from each of the first image 10 and the second image 20. Here, the feature points detected from the first image 10 and the second image 20 may be any type of feature points. Further, an existing technique can be used as a technique for detecting a feature point from an image.

Further, the first detection unit 2020 computes feature values of regions including feature points for the feature points detected from the first image 10 and the second image 20, respectively. The feature value computed here is, for example, a scale-invariant feature value such as SIFT or a feature value (hereinafter, an affine-invariant feature value) invariant with respect to affine deformation such as Hessian-Affine or Affine-SIFT. An existing technique can also be used as a method of computing these feature values.

The first detection unit 2020 performs feature point matching between a plurality of feature points on the first image 10 and a plurality of feature points on the second image 20 using feature values computed for the feature points, respectively. That is, the first detection unit 2020 associates a feature point on the first image 10 and a feature point on the second image 20 with each other based on the degree of similarity of feature values. In this manner, the feature point on the first image 10 and the feature point on the second image 20 associated by the feature point matching can be used as a feature point pair. Note that an existing technique can be used as a technique for detecting corresponding points from two images by feature point matching.

The first detection unit 2020 detects any three or more pairs among pairs of the feature points on the first image 10 and the feature points on the second image 20 associated in this manner as the feature point pairs. For example, the first detection unit 2020 selects any one of the feature points detected from the first image 10, and identifies a feature point on the second image 20 that is associated with the selected feature point by feature point matching. That is, the first detection unit 2020 identifies the feature point on the second image 20 having a feature value sufficiently similar to a feature value computed for the feature point extracted from the first image 10 (the degree of similarity of the feature values is equal to or greater than a threshold), and detects a pair of the identified feature point and the feature point extracted from the first image 10 as a feature point pair. The first detection unit 2020 detects any number of feature point pairs by repeating this process any number of times.

Note that a flow of the processing of detecting a feature point pair is not limited to the above-described flow. For example, the first detection unit 2020 may detect a feature point pair by selecting any one of the feature points detected from the second image 20 and detecting a feature point corresponding to the selected feature point from the first image 10.

<Detection of Derived Point Pair: S106>

The second detection unit 2040 detects derived point pairs for the feature point pairs, respectively (S106). A derived point detected based on a feature point on the first image 10 is a point separated from the feature point on the first image 10 by a first distance in a first direction. On the other hand, a derived point detected based on a feature point on the second image 20 is a point separated from the feature point on the second image 20 by a second distance in a second direction.

As described above, the first direction, the first distance, the second direction, and the second distance are determined using feature values computed for the feature point. For example, as described above, in a case where the scale-invariant feature value is used, for example, a main-axis direction in a feature value computed for a feature point on the first image 10 is used as the first direction. Similarly, for example, a main-axis direction in a feature value computed for a feature point on the second image 20 is used as the second direction.

However, each of the first direction and the second direction only needs to be a direction determined with the main-axis direction as a reference, and may be a direction different from the main-axis direction. For example, each of the first direction and the second direction may be a direction opposite to (a direction different by 180 degrees from) the main-axis direction, a direction rotated from the main-axis direction by a predetermined angle (for example, +90 degrees), or the like.

Here, it is preferable to determine the first direction such that a feature point on the first image 10 included in a certain feature point pair, a derived point thereof, a feature point on the first image 10 included in another feature point pair, and a derived point thereof do not pass through the same straight line as each other. This is because two of the three feature points and two derived points become linearly dependent in such a case.

Therefore, for example, the second detection unit 2040 determines whether or not the three feature points and the three derived points on the first image 10 are located on the same straight line, and may change the first direction to detect a derived point again in a case where the points are located on one straight line. For example, the main-axis direction is set to an initial value of the first direction, and the detection of a derived point is performed. Then, in a case where two feature points and two derived points on the first image 10 are located on the same straight line, the second detection unit 2040 shifts the first direction from the main-axis direction in a predetermined direction and then detects a derived point again. Note that an existing technique can be used as a technique for determining whether or not a plurality of points is located on one straight line.

The above-described degeneracy may also occur in the second image 20. Therefore, the second detection unit 2040 preferably prevents feature points and derived points detected from the second image 20 from being located on one straight line by the same method.

As the first distance, a predetermined multiple of the size of the scale in the feature value computed for the feature point on the first image 10 is used. Similarly, as the second distance, a predetermined multiple of the size of the scale in a feature value computed for the feature point on the second image 20 is used. The predetermined multiple used to compute the first distance and the predetermined multiple used to compute the second distance are values equal to each other. If the predetermined multiple=1 time, the value of the scale is directly used. The example of FIG. 2 is an example in which the predetermined multiple=1 time.

The feature value is not limited to the scale-invariant feature value, and may be an affine deformation feature value. In this case, as the first direction, for example, a direction of a specific axis determined for the feature value computed for the feature point on the first image 10 is used. Similarly, as the second direction, for example, a direction of a specific axis determined for the feature value computed for the feature point on the second image 20 is used. The specific axis is, for example, a minor axis or a major axis. However, the first direction and the second direction may be respectively directions opposite to the minor-axis direction or the major-axis direction (direction different by 180 degrees), or respectively a directions rotated by a predetermined angle in the minor-axis direction or the major-axis direction. However, the first direction and the second direction are set to directions of the same type. That is, when the first direction is the minor-axis direction, the second direction is also the minor-axis direction, and when the first direction is the major-axis direction, the second direction is also the major-axis direction.

As the first distance, a predetermined multiple of a length of a specific axis determined for the feature value computed for the feature point on the first image 10 is used. Similarly, as the second distance, a predetermined multiple of a length of the specific axis determined for the feature value computed for the feature point on the second image 20 is used. The predetermined multiple used to compute the first distance and the predetermined multiple used to compute the second distance are values equal to each other.

The second detection unit 2040 may detect two or more derived point pairs from one feature point pair. For example, it is assumed that the second detection unit 2040 detects two derived points from a feature point on the first image 10 included in a feature point pair in a case where a scale-invariant feature value is used. In this case, for example, it is configured that "First direction=main-axis direction and first distance=k1 times of scale" is set for one derived point p11, and "First direction=direction opposite to major-axis and first distance=k2 times of scale" is set for the other derived point p12. Here, k1 and k2 may be equal to each other or may not be equal to each other. Similarly, the second detection unit 2040 also detects two derived points from a feature point on the second image 20 included in a feature point pair. It is configured that "Second direction=main-axis direction and second distance=k1 times of scale" is set for one derived point q11, and "Second direction=direction opposite to major-axis and second distance=k2 times of scale" is set for the other derived point q12. Then, the second detection unit 2040 detects (p11, q11) and (p12, q12) as derived point pairs.

In addition, for example, it is assumed that the second detection unit 2040 detects four sets of derived points from a feature point on the first image 10 included in a feature point pair in a case where an affine-invariant feature value is used. In this case, for example, it is configured that "First direction=minor-axis direction and first distance=k1 times of minor-axis length" is set for a derived point p11, "First direction=direction opposite to minor-axis direction and first distance=k2 times of minor-axis length" is set for a derived point p12, "First direction=major-axis direction and first distance=k3 times of major-axis length" is set for a derived point p13, and "First direction=direction opposite to major-axis direction and first distance=k4 times of major-axis length" is set for a derived point p14. Here, k1, k2, k3, and k4 may be equal to each other or may not equal to each other.

Similarly, the second detection unit 2040 also detects the four sets of derived points q11, q12, q13, and q14 from a feature point on the second image 20 included in the feature point pair. It is configured that "Second direction=minor-axis direction and second distance=k1 times of minor-axis length" is set for a derived point q11, "Second direction=direction opposite to minor-axis direction and second distance=k2 times of minor-axis length" is set for a derived point q12, "Second direction=major-axis direction and second distance=k3 times of major-axis length" is set for a derived point q13, and "Second direction=direction opposite to major-axis direction and second distance=k4 times of major-axis length" is set for a derived point q14.

Then, the second detection unit 2040 detects (p11, q11), (p12, q12), (p13, q13), and (p14, q14) as derived point pairs.

<Generation of Fundamental Matrix 40: S108>

The generation unit 2060 generates the fundamental matrix 40 using the six or more corresponding point pairs (feature point pairs and derived point pairs). Here, an existing technique can be used as a technique for computing the fundamental matrix using the six or more corresponding point pairs.

For example, the fundamental matrix 40 is computed by solving an optimization problem represented by the following Equation (3).

Equation 3

$$\min_{f,Q} \sum \|n^T F m\|^2 = \|Mf\|^2 \tag{3}$$

$$\text{s.t. } \det(F) = 0,\ 2FQF^T QF - \text{trace}(FQF^T Q)F = 0,\ \|f\|^2 = 1$$

Here, a vector f is a vector representation of the matrix F (the fundamental matrix 40), and a matrix M is a coefficient matrix including the vector m and the vector n.

Note that it is known that Equation (3) can be solved as a polynomial problem described in Non Patent Literature 2 or Non Patent Literature 3 in the case of six or seven points. Further, in the case of eight or more points, as described in Non Patent Literature 1, it is known that it can be reduced to a linear least squares method by ignoring constraints other than $\|f\|^2=1$. Then, as a computation method based on the linear least squares method, a direct linear transform (DLT) method or the like can be used.

Here, the generation unit 2060 may use normalized coordinates, instead of using coordinates of each point included in a corresponding point pair as they are. This can reduce an error in numerical computation. For example, as coordinate normalization, there is a method of performing a similarity transform such that an average of coordinate values is zero and a variance is $\sqrt{2}$. In the case of using normalized coordinate values in this manner, the generation unit 2060 can generate the fundamental matrix 40 by applying an inverse transform of the similarity transform to a matrix obtained by a method such as the DLT method.

Here, coordinates of each point of a feature point pair may be normalized before detecting a derived point pair. In this case, the second detection unit 2040 also performs the similar transform regarding the size of the scale of the scale-invariant feature value or the length of the specific axis of the affine-invariant feature value, and then detects a derived point pair.

<Estimation of Internal Parameters>

As described above, Non Patent Literature 2 discloses a technique for estimating a focal length together with a fundamental matrix using six corresponding point pairs. Further, Non Patent Literature 3 discloses a technique for estimating a focal length and lens distortion together with a fundamental matrix using seven or more corresponding point pairs. Therefore, when these techniques are applied to the fundamental matrix generation apparatus 2000, the generation unit 2060 may further perform estimation of internal parameters in addition to the generation of the fundamental matrix 40.

Here, since the seven or more corresponding point pairs are required in the case of using the technique of Non Patent Literature 3, the first detection unit 2020 detects four or more feature point pairs. Further, the second detection unit 2040 detects three or more derived point pairs.

<Output of Result>

The fundamental matrix generation apparatus 2000 outputs information (hereinafter, output information) including the generated fundamental matrix 40. The output information may be output in any manner. For example, the fundamental matrix generation apparatus 2000 displays the output information on a display device accessible from the fundamental matrix generation apparatus 2000. In addition, for example, the fundamental matrix generation apparatus 2000 puts the output information in a storage apparatus accessible from the fundamental matrix generation apparatus 2000. In addition, for example, the fundamental matrix generation apparatus 2000 transmits the output information to another apparatus connected to the fundamental matrix generation apparatus 2000 to be capable of communicating with each other.

The output information may include only the fundamental matrix 40, or may further include information other than the fundamental matrix 40. For example, the output information preferably includes information that enables to understand what images are connected by the fundamental matrix 40. Therefore, for example, the output information includes an identifier of the first image 10 and an identifier of the second image 20 as identifiers (for example, file names or image data itself) of the images associated with each other by the fundamental matrix 40.

<Improvement in Accuracy of Fundamental Matrix 40>

The fundamental matrix generation apparatus 2000 may generate the fundamental matrix 40 with higher accuracy by the following method. In a case where three-dimensional coordinates restored by triangulation using mi, ni, and the fundamental matrix, and the three-dimensional coordinates are reprojected onto the first image 10 and the second image 20, the accuracy of the fundamental matrix 40 referred to herein means smallness of an error between a two-dimensional point reprojected on the first image 10 and the point mi on the first image 10 and smallness of an error between a two-dimensional point reprojected on the second image 20 and the point ni on the second image 20. It can be said that the accuracy of the fundamental matrix 40 is higher as these reprojection errors are smaller since points on the first image 10 and points on the second image 20 accurately satisfy a geometric constraint due to the fundamental matrix 40. Note that, instead of the reprojection error, an algebraic error (for example, Sampson error) with a smaller amount of computation may be used. Hereinafter, these errors are collectively referred to as epipolar errors.

The fundamental matrix generation apparatus 2000 generates a plurality of the fundamental matrices 40 while variously changing corresponding point pairs used for generating the fundamental matrix 40. Then, the fundamental matrix generation apparatus 2000 selects an essential matrix with the highest accuracy from the plurality of fundamental matrices 40, and outputs output information including the selected fundamental matrix 40.

Figure 6:
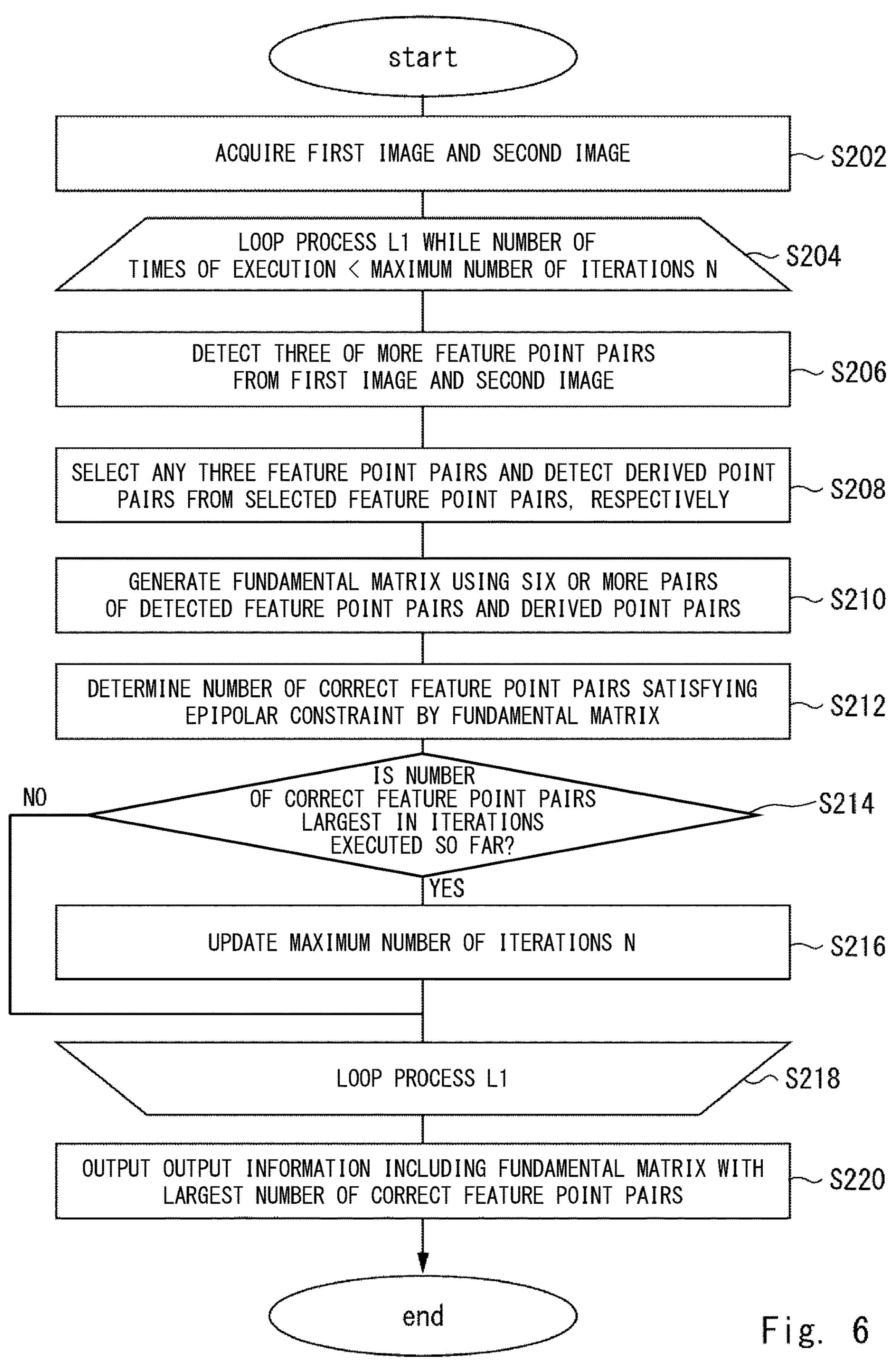
FIG. 6 is a flowchart illustrating a flow of processing executed by the fundamental matrix generation apparatus using RANSAC.

For example, the fundamental matrix generation apparatus 2000 uses RANSAC to generate the fundamental matrix 40 with high accuracy. FIG. 6 is a flowchart illustrating a flow of processing executed by the fundamental matrix generation apparatus 2000 using RANSAC.

The first detection unit 2020 acquires the first image 10 and the second image 20 (S202). S204 to S218 constitute a loop process L1 that is repeatedly executed until the number of times of execution reaches the maximum number of iterations N. In S204, the fundamental matrix generation apparatus 2000 determines whether or not the number of times of execution of the loop process L1 is equal to or greater than the maximum number of iterations N. When the number of times of execution of the loop process L1 is equal to or greater than the maximum number of iterations N, the processing of FIG. 6 proceeds to S220. On the other hand, when the number of times of execution of the loop process L1 is not equal to or greater than the maximum number of iterations N, the processing of FIG. 6 proceeds to S206.

The first detection unit 2020 detects a plurality of feature point pairs from the first image 10 and the second image 20 (S206). The second detection unit 2040 selects at least any three feature point pairs from the feature point pairs detected in S206, and detects derived point pairs for the selected feature point pairs, respectively (S208). The generation unit 2060 generates the fundamental matrix 40 by using the selected three feature point pairs and three derived point pairs detected by using the selected three feature point pairs (that is, six corresponding point pairs) (S210). Note that, in S210, estimation of internal parameters such as a focal length and lens distortion may be performed together with the generation of the fundamental matrix 40. However, in the case of using the technique of Non Patent Literature 3, four feature point pairs are used in S210.

The fundamental matrix generation apparatus 2000 determines the number of feature point pairs satisfying the epipolar constraint by the fundamental matrix 40 among the plurality of feature point pairs detected in S206 (S212). Here, the expression "the feature point pairs satisfy the epipolar constraint by the fundamental matrix 40" means that the epipolar error defined by the fundamental matrix 40 is sufficiently small (for example, less than a threshold) regarding the point mi on the first image 10 and the point ni on the second image 20 included in the feature point pair. Hereinafter, a feature point pair correctly associated by the fundamental matrix 40 (a feature point pair with the error being smaller than the threshold) is referred to as a "correct feature point pair", and a feature point pair not correctly associated by the fundamental matrix 40 (a feature point pair with the error being equal to or greater than the threshold) is referred to as an "incorrect feature point pair".

In order to determine the number of correct feature point pairs, the fundamental matrix generation apparatus 2000 computes, for each feature point pair, 1) the epipolar error regarding the point mi on the first image 10 included in the feature point pair and the point ni on the second image 20 included in the feature point pair, and 2) determines whether or not the computed error is smaller than the threshold. Then, the fundamental matrix generation apparatus 2000 determines the number of feature point pairs (that is, correct feature point pairs) with the errors being smaller than the threshold.

In S214, the fundamental matrix generation apparatus 2000 determines whether or not the number of the correct feature point pairs is the largest in the numbers computed in the loop processes L1 that have been executed so far. In a case where the number of the correct feature point pairs is not the maximum in the numbers computed so far (S214: NO), the processing of FIG. 6 proceeds to S218. On the other hand, in a case where the number of the correct feature point pairs is the largest in the numbers computed so far (S214: YES), the fundamental matrix generation apparatus 2000 updates the maximum number of iterations of the loop process L1 (S216).

Here, the maximum number of iterations is expressed by, for example, the following Equation (4).

Equation 4

$$N = \frac{\log(1-p)}{\log(1-(1-\epsilon)^s)} \tag{4}$$

Here, N represents the maximum number of iterations. A probability that there is a feature point pair correctly transformed by the fundamental matrix 40 once in N times is represented by p. The number of corresponding point pairs (three in the above example) used to generate the fundamental matrix 40 is represented by s. A ratio of incorrect feature point pairs to the total number of feature point pairs is represented by ¿.

Here, since a true value of & is unknown, an estimated value thereof is used. Specifically, the fundamental matrix generation apparatus 2000 performs estimation using the largest number among the numbers of correct feature point pairs computed in the loop processes L1 that have been executed so far. When the largest number is expressed as Km and a total number of feature point pairs is expressed as Kall, ε can be estimated as (Kall-Km)/Kall.

Since S218 is the end of the loop process L1, the processing of FIG. 6 returns to S204.

When the repetitive execution of the loop process L1 ends, the processing of FIG. 6 proceeds to S220. In S220, the fundamental matrix generation apparatus 2000 includes, in the output information, the fundamental matrix 40 generated in the loop process L1 in which the number of correct feature point pairs is the largest among the fundamental matrices 40 generated in the respective loop processes L1 executed a plurality of times, and output it. As a result, the fundamental matrix 40 having the highest accuracy among the plurality of generated fundamental matrices 40 is output.

Here, since the derived point pair is detected using the feature point pair in the fundamental matrix generation apparatus 2000 of the present example embodiment, the number of sample points required in one trial of RANSAC (one execution of the loop process L1 in FIG. 6) is three (s=3 in Equation (4)). Therefore, a value of the maximum number of iterations N decreases exponentially as compared with a case where five sample points are required as in the invention of Non Patent Literature 1 (the case where s=5 in Equation (4)) and a case where eight sample points are required as in an invention of Non Patent Literature 2 (the case where s=8 in Equation (4)). Therefore, the amount of computation of RANSAC is reduced.

Note that, as a method of generating a fundamental matrix with corresponding point pairs fewer than six, a method of using two sets of affine-invariant feature points is described in Non Patent Literature 4. In the method described in Non Patent Literature 4, a fundamental matrix is computed by solving a constraint satisfied by a local affine transform and an epipolar constraint.

In the method of Non Patent Literature 4, since the number of corresponding point pairs is two, the maximum number of iterations of RANSAC is theoretically smaller than that of the fundamental matrix generation apparatus 2000 of the present example embodiment. However, the fundamental matrix generation apparatus 2000 of the present example embodiment has an advantage that the overall execution time is shortened as compared with the method of Non Patent Literature 4. For example, the amount of computation of an affine-invariant feature point generally requires several times to several tens of times of that of a scale-invariant feature point, and thus, the processing time required for the first detection unit 2020 of the present example embodiment is significantly smaller than that in Non Patent Literature 4. Therefore, when comparing the overall execution time, it is considered that the fundamental matrix generation apparatus 2000 of the present example embodiment is faster.

<<Omission of Generation of Fundamental Matrix 40>>

The fundamental matrix generation apparatus 2000 may generate the fundamental matrix 40 only when a specific condition is satisfied, instead of generating the fundamental matrix 40 every time in the loop process L1. Specifically, the fundamental matrix generation apparatus 2000 computes signed areas using the three feature point pairs selected in S206 and the three derived point pairs detected using these feature point pairs. Then, it is determined whether or not to generate the fundamental matrix 40 based on correctness of signs of the signed areas. Hereinafter, this will be described in detail.

First, when homogenized image coordinates {x1, x2, x3} of three points are given, a signed area is expressed by the following Equation (5).

Equation 5

$$\det(x_1, x_2, x_3) = x_1^T(x_2 \times x_3) \quad (5)$$

Equation (5) is equivalent to a so-called determinant of a 3×3 matrix. When six corresponding point pairs are given and all of them are correct corresponding point pairs, any three sets are selected from the six sets to compute Equation (5). Then, signs thereof are always the same as each other. For example, it is assumed that selected feature point pairs are (m1, n1) and (m2, n2), and derived point pairs detected using these are (p1, q1) and (p2, q2). In this case, for example, if three sets of (m1, n1), (m2, n2), and (p1, q1) are selected as a target of computation of the signed area, det (m1, m2, p1) and det (n1, n2, q1) are computed. Then, if all the six corresponding point pairs are correct corresponding point pairs, signs of the two computed signed areas are the same as each other.

Figure 7:
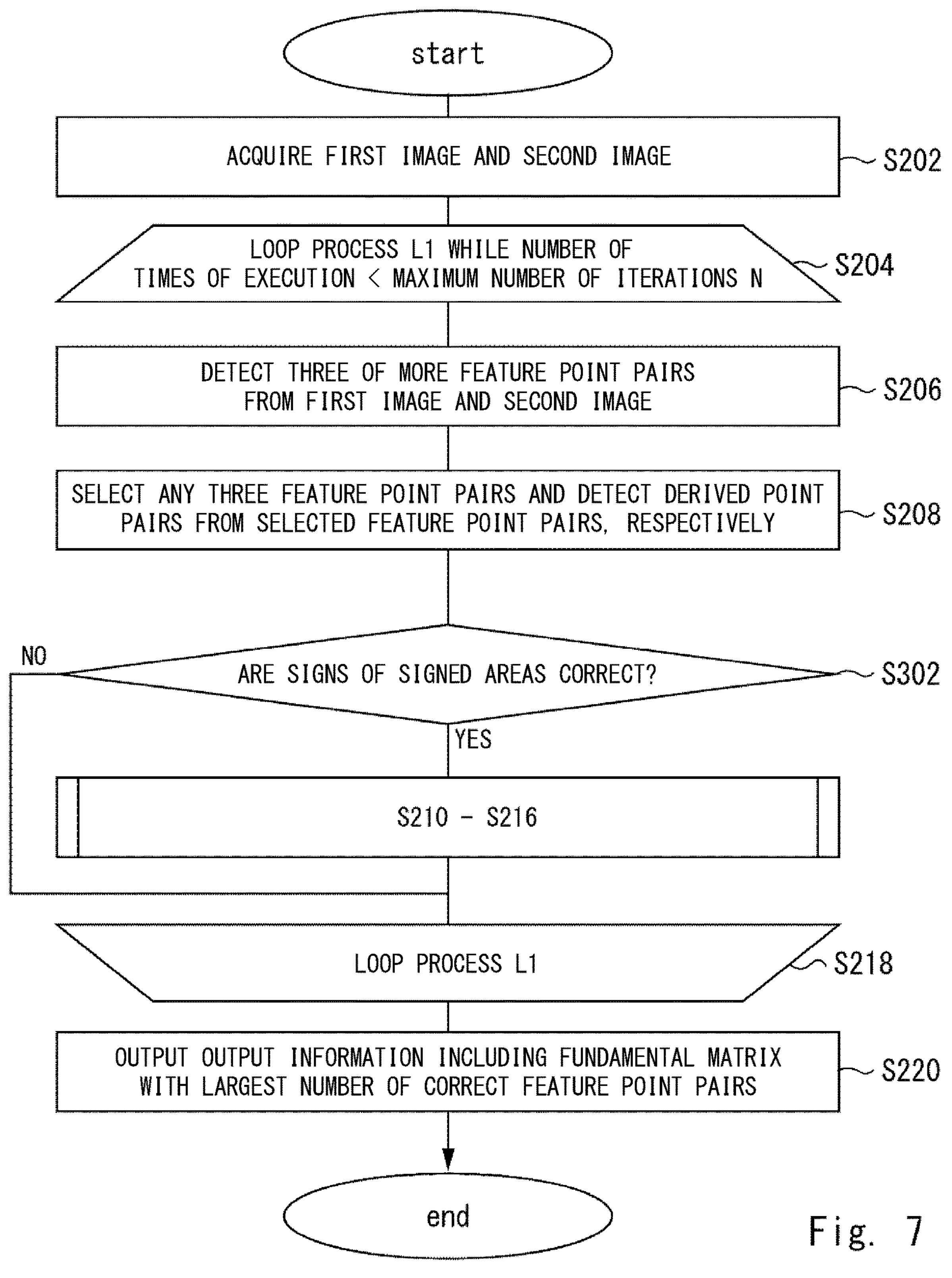
FIG. 7 is a view illustrating an example in which a process of determining whether or not to generate a fundamental matrix using a signed area is added to the flowchart of FIG. 6.

Therefore, the fundamental matrix generation apparatus 2000 selects the three corresponding point pairs from the six corresponding point pairs, computes the above-described signed areas for these corresponding point pairs, and determines whether or not the signs of the two computed signed areas are equal. Then, in a case where the signs of the signed areas are correct, the fundamental matrix generation apparatus 2000 executes the processing from S210. On the other hand, in a case where the signs of the signed areas are incorrect, the fundamental matrix generation apparatus 2000 does not generate the fundamental matrix 40 and returns to the head of the loop process L1. FIG. 7 is a view illustrating an example in which a process of determining whether or not to generate the fundamental matrix 40 using a signed area is added to the flowchart of FIG. 6. This determination process is S302.

Here, in a case where three corresponding point pairs are selected from the six corresponding point pairs, there are twenty ways of selection. The fundamental matrix generation apparatus 2000 performs the above-described computation of the signed area for any one or more of these twenty ways of selection, and determines whether or not signs are the same as each other. For example, the fundamental matrix generation apparatus 2000 performs the determination for all the twenty ways. Then, when signs of the computed two signed areas are equal to each other in all cases, the fundamental matrix generation apparatus 2000 generates the fundamental matrix 40 (determines that the signs of the signed areas are correct in S302). Further, for example, the signed areas may be computed for the three feature point pairs, and derived point pairs may be computed only when the signs are the same as each other. In this case, first, the determination process is performed in S302. Only in the case of YES, the derived point pairs are computed in S208, and the processing from S210 is executed.

<<Use Other than RANSAC>>

A method for improving the accuracy of the fundamental matrix 40 is not limited to a method using RANSAC. For example, since there are various derivatives of RANSAC, it is possible to selectively combine these derivatives. For example, in a case where progressive sample consensus (PROSAC) is used, feature point pairs are selected in ascending order of a feature value matching score. That is, in S208, instead of random selection of a feature point pair, feature point pair are selected in ascending order of the feature value matching score (that is, from a higher degree of similarity between feature values).

In addition, for example, locally optimized RANSAC (LO-RANSAC) may be used. In this case, when it is determined in S214 that the number of correct feature point pairs is the largest (S214: YES), the generation unit 2060 configured to solve Equation (2) using the corresponding point pairs may be caused to execute processing, or a weighting least squares method such as M-estimator may be used.

Although the present invention has been described above with reference to the example embodiments, the present invention is not limited to the above-described example embodiments. Various modifications that can be understood by those skilled in the art can be made to the configuration and details of the present invention within the scope of the present invention.

Note that, in the above-described example, the program can be stored and provided to a computer using any type of non-transitory computer-readable media. The non-transitory computer-readable media include various types of tangible storage media. Examples of the non-transitory computer-readable media include magnetic storage media (such as floppy disks, magnetic tapes, hard disk drives, or the like), optical magnetic storage media (for example, magneto-optical disks), CD-ROM, CD-R, CD-R/W, and semiconductor memories (such as mask ROM, PROM (Programmable ROM), EPROM (Erasable PROM), flash ROM, RAM, or the like). Further, programs may be provided to computers by various types of transitory computer-readable media. Examples of the transitory computer-readable media include electric signals, optical signals, and electromagnetic waves. The transitory computer-readable media can provide the program to the computer via a wired communication line such as an electric wire and optical fibers or a wireless communication line.

A part or whole of the above-described example embodiment may be described as in the following Supplementary Notes, but is not limited to the following Supplementary Notes.

(Supplementary Note 1)

A fundamental matrix generation apparatus comprising:

a first detection unit configured to detect, from a first image and a second image, three or more feature point pairs that pairs of feature points corresponding to each other;

a second detection unit configured to detect, for each of the feature point pairs, a derived point pair that is a pair of a point separated by a first distance in a first direction from a point on the first image included in the feature point pair and a point separated by a second distance in a second direction from a point on the second image included in the feature point pair; and a generation unit configured to generate a fundamental matrix representing an epipolar constraint between a point on the first image and a point on the second image using each of the detected feature point pairs and the detected derived point pairs, wherein the first direction and the first distance are each determined based on a feature value computed for the point on the first image included in the feature point pair, and wherein the second direction and the second distance are each determined based on a feature value computed for the point on the second image included in the feature point pair.

(Supplementary Note 2)

The fundamental matrix generation apparatus according to supplementary note 1, wherein the first direction and the first distance are determined based on a main-axis direction and a length of a scale of a scale-invariant feature value computed for a point on the first image, respectively, and wherein the second direction and the second distance are determined based on a main-axis direction and a length of a scale of a scale-invariant feature value computed for a point on the second image, respectively.

(Supplementary Note 3)

The fundamental matrix generation apparatus according to supplementary note 1, wherein the first direction and the first distance are determined based on a specific-axis direction and a length of that axis of an affine-invariant feature value computed for a point on the first image, respectively, and wherein the second direction and the second distance are determined based on a specific-axis direction and a length of that axis of an affine-invariant feature value computed for a point on the second image.

(Supplementary Note 4)

The fundamental matrix generation apparatus according to any one of supplementary notes 1 to 3, wherein the fundamental matrix is repeatedly generated while changing the feature point pair used to detect the derived point pair, and a fundamental matrix with highest accuracy among a plurality of the generated fundamental matrices is output.

(Supplementary Note 5)

The fundamental matrix generation apparatus according to any one of supplementary notes 1 to 4, wherein signed areas are computed using any three sets of a plurality of the feature point pairs and a plurality of the derived point pairs, and whether or not to generate the fundamental matrix is determined based on signs of the computed signed areas.

(Supplementary Note 6)

The fundamental matrix generation apparatus according to any one of supplementary notes 1 to 5, wherein the generation unit estimates internal parameters of a camera that has generated the first image and a camera that has generated the second image by using each of the detected feature point pairs and derived point pairs.

(Supplementary Note 7)

A control method executed by a computer, comprising:

a first detection step of detecting, from a first image and a second image, three or more feature point pairs that are pairs of feature points corresponding to each other;

a second detection step of detecting, for each of the feature point pairs, a derived point pair that is a pair of a point separated by a first distance in a first direction from a point on the first image included in the feature point pair and a point separated by a second distance in a second direction from a point on the second image included in the feature point pair; and a generation step of generating a fundamental matrix representing an epipolar constraint between a point on the first image and a point on the second image using each of the detected feature point pairs and the detected derived point pairs, wherein the first direction and the first distance are each determined based on a feature value computed for the point on the first image included in the feature point pair, and wherein the second direction and the second distance are each determined based on a feature value computed for the point on the second image included in the feature point pair.

(Supplementary Note 8)

The control method according to supplementary note 7, wherein the first direction and the first distance are determined based on a main-axis direction and a length of a scale of a scale-invariant feature value computed for a point on the first image, respectively, and wherein the second direction and the second distance are determined based on a main-axis direction and a length of a scale of a scale-invariant feature value computed for a point on the second image, respectively.

(Supplementary Note 9)

The control method according to supplementary note 7, wherein the first direction and the first distance are determined based on a specific-axis direction and a length of that axis of an affine-invariant feature value computed for a point on the first image, respectively, and wherein the second direction and the second distance are determined based on a specific-axis direction and a length of that axis of an affine-invariant feature value computed for a point on the second image.

(Supplementary Note 10)

The control method according to any one of supplementary notes 7 to 9, wherein the fundamental matrix is repeatedly generated while changing the feature point pair used to detect the derived point pair, and a fundamental matrix with highest accuracy among a plurality of the fundamental essential matrices is output.

(Supplementary Note 11)

The control method according to any one of supplementary notes 7 to 10, wherein signed areas are computed for any three sets of a plurality of the feature point pairs and a plurality of the derived point pairs, and whether or not to generate the fundamental matrix is determined based on signs of the computed signed areas.

(Supplementary Note 12)

The control method according to any one of supplementary notes 7 to 11, wherein, in the generation step, estimating internal parameters of a camera that has generated the first image and a camera that has generated the second image by using each of the detected feature point pairs and derived point pairs.

(Supplementary Note 13)

A computer-readable medium storing a program that causes a computer to execute:

a first detection step of detecting, from a first image and a second image, three or more feature point pairs that are pairs of feature points corresponding to each other;

a second detection step of detecting, for each of the feature point pairs, a derived point pair that is a pair of a point separated by a first distance in a first direction from a point on the first image included in the feature point pair and a point separated by a second distance in a second direction from a point on the second image included in the feature point pair; and a generation step of generating a fundamental matrix representing an epipolar constraint between a point on the first image and a point on the second image using each of the detected feature point pairs and the detected derived point pairs, wherein the first direction and the first distance are each determined based on a feature value computed for the point on the first image included in the feature point pair, and wherein the second direction and the second distance are each determined based on a feature value computed for the point on the second image included in the feature point pair.

(Supplementary Note 14)

The computer-readable medium of supplementary note 13, wherein the first direction and the first distance are determined based on a main-axis direction and a length of a scale of a scale-invariant feature value computed for a point on the first image, respectively, and wherein the second direction and the second distance are determined based on a main-axis direction and a length of a scale of a scale-invariant feature value computed for a point on the second image, respectively.

(Supplementary Note 15)

The computer-readable medium of supplementary note 13, wherein the first direction and the first distance are determined based on a specific-axis direction and a length of that axis of an affine-invariant feature value computed for a point on the first image, respectively, and wherein the second direction and the second distance are determined based on a specific-axis direction and a length of that axis of an affine-invariant feature value computed for a point on the second image.

(Supplementary Note 16)

The computer-readable medium according to any one of supplementary notes 13 to 15, causing the computer to execute a step of repeatedly generating the fundamental matrix while changing the feature point pair used to detect the derived point pair, and outputting a fundamental matrix with highest accuracy among a plurality of the generated fundamental matrices.

(Supplementary Note 17)

The computer-readable medium according to any one of supplementary notes 13 to 16, causing the computer to execute a step of computing signed areas for any three sets of a plurality of the feature point pairs and a plurality of the derived point pairs, and determining whether or not to generate the fundamental matrix based on signs of the computed signed areas.

(Supplementary Note 18).

The computer-readable medium according to any one of supplementary notes 13 to 17, wherein, in the generation step, estimating internal parameters of a camera that has generated the first image and a camera that has generated the second image by using each of the detected feature point pairs and derived point pairs.

REFERENCE SIGNS LIST

10 First Image
20 Second Image
40 Fundamental Matrix
500 Computer
502 Bus
504 Processor
506 Memory
508 Storage Device
510 Input/Output Interface
512 Network Interface
2000 Fundamental Matrix Generation Apparatus
2020 First Detection Unit
2040 Second Detection Unit
2060 Generation Unit

What is claimed is:

1. A fundamental matrix generation apparatus comprising:

at least one memory that is configured to store instructions; and at least one processor that is configured to execute the instructions to:

detect, from a first image and a second image, three or more feature point pairs that pairs of feature points corresponding to each other;

detect, for each of the feature point pairs, a derived point pair that is a pair of a point separated by a first distance in a first direction from a point on the first image included in the feature point pair and a point separated by a second distance in a second direction from a point on the second image included in the feature point pair; and generate a fundamental matrix representing an epipolar constraint between a point on the first image and a point on the second image using each of the detected feature point pairs and the detected derived point pairs, wherein the first direction and the first distance are determined based on a feature value computed for the point on the first image included in the feature point pair, wherein the second direction and the second distance are determined based on a feature value computed for the point on the second image included in the feature point pair, wherein the first direction is determined based on a main-axis direction of a scale-invariant feature value computed for a point on the first image, wherein the first distance is determined based on a length of a scale of the scale-invariant feature value computed for the point on the first image, wherein the second direction is determined based on a main-axis direction of a scale of a scale-invariant feature value computed for a point on the second image, and wherein the second distance is determined based on a length of a scale of the scale-invariant feature value computed for the point on the second image, wherein the at least one processor is configured to execute the instructions further to:

compute signed areas using any three sets of a plurality of the feature point pairs and a plurality of the derived point pairs; and determine whether or not to generate the fundamental matrix based on signs of the computed signed areas.

2. The fundamental matrix generation apparatus according to claim 1, wherein the at least one processor is configured to execute the instructions further to:

repeatedly generate the fundamental matrix while changing the feature point pair used to detect the derived point pair; and output a fundamental matrix with highest accuracy among a plurality of the generated fundamental matrices.

3. The fundamental matrix generation apparatus according to claim 1, wherein the at least one processor is configured to execute the instructions further to estimate internal parameters of a camera that has generated the first image and a camera that has generated the second image by using each of the detected feature point pairs and derived point pairs.

4. A control method executed by a computer, comprising:

detecting, from a first image and a second image, three or more feature point pairs that are pairs of feature points corresponding to each other;

detecting, for each of the feature point pairs, a derived point pair that is a pair of a point separated by a first distance in a first direction from a point on the first image included in the feature point pair and a point separated by a second distance in a second direction from a point on the second image included in the feature point pair; and generating a fundamental matrix representing an epipolar constraint between a point on the first image and a point on the second image using each of the detected feature point pairs and the detected derived point pairs, wherein the first direction and the first distance are determined based on a feature value computed for the point on the first image included in the feature point pair, wherein the second direction and the second distance are determined based on a feature value computed for the point on the second image included in the feature point pair, wherein the first direction is determined based on a main-axis direction and a length of a scale of a scale-invariant feature value computed for a point on the first image, wherein the first distance is determined based on a length of a scale of the scale-invariant feature value computed for the point on the first image, wherein the second direction is determined based on a main-axis direction of a scale-invariant feature value computed for a point on the second image, and wherein the second distance is determined based on a length of a scale of the scale-invariant feature value computed for the point on the second image, wherein the control method further comprises:

computing signed areas for any three sets of a plurality of the feature point pairs and a plurality of the derived point pairs; and determining whether or not to generate the fundamental matrix based on signs of the computed signed areas.

5. The control method according to claim 4, further comprising:

repeatedly generating the fundamental matrix while changing the feature point pair used to detect the derived point pair; and outputting a fundamental matrix with highest accuracy among a plurality of the fundamental essential matrices.

6. The control method according to claim 4, further comprising:

estimating internal parameters of a camera that has generated the first image and a camera that has generated the second image by using each of the detected feature point pairs and derived point pairs.

7. A non-transitory computer-readable medium storing a program that causes a computer to execute:

detecting, from a first image and a second image, three or more feature point pairs that are pairs of feature points corresponding to each other;

detecting, for each of the feature point pairs, a derived point pair that is a pair of a point separated by a first distance in a first direction from a point on the first image included in the feature point pair and a point separated by a second distance in a second direction from a point on the second image included in the feature point pair; and generating a fundamental matrix representing an epipolar constraint between a point on the first image and a point on the second image using each of the detected feature point pairs and the detected derived point pairs, wherein the first direction and the first distance are determined based on a feature value computed for the point on the first image included in the feature point pair, wherein the second direction and the second distance are determined based on a feature value computed for the point on the second image included in the feature point pair, wherein the first direction is determined based on a main-axis direction and a length of a scale of a scale-invariant feature value computed for a point on the first image, wherein the first distance is determined based on a length of a scale of the scale-invariant feature value computed for the point on the first image, wherein the second direction is determined based on a main-axis direction of a scale-invariant feature value computed for a point on the second image, and wherein the second distance is determined based on a length of a scale of the scale-invariant feature value computed for the point on the second image, wherein the program further causes the computer to further execute:

computing signed areas for any three sets of a plurality of the feature point pairs and a plurality of the derived point pairs; and determining whether or not to generate the fundamental matrix based on signs of the computed signed areas.

8. The non-transitory computer-readable medium according to claim 7, wherein the program causes the computer to further execute:

repeatedly generating the fundamental matrix while changing the feature point pair used to detect the derived point pair; and outputting a fundamental matrix with highest accuracy among a plurality of the generated fundamental matrices.

9. The non-transitory computer-readable medium according to claim 7, wherein the program causes the computer to further execute: estimating internal parameters of a camera that has generated the first image and a camera that has generated the second image by using each of the detected feature point pairs and derived point pairs.

* * * * *